United States Patent [19]

Ikebe et al.

[11] Patent Number: 5,091,814
[45] Date of Patent: Feb. 25, 1992

[54] DISK CARTRIDGE HAVING DISCONTINUOUS HUB-POSITION DETERMINING RIB

[75] Inventors: Masaru Ikebe; Haruo Shiba; Morimasa Sasaki, all of Tokyo, Japan

[73] Assignee: TDK Corporation, Tokyo, Japan

[21] Appl. No.: 617,090

[22] Filed: Nov. 23, 1990

[30] Foreign Application Priority Data

Nov. 28, 1989 [JP]  Japan .................................. 1-308707

[51] Int. Cl.⁵ ............................................ G11B 23/03
[52] U.S. Cl. ..................................................... 360/133
[58] Field of Search .................... 360/133, 99.12, 99.05

[56] References Cited

U.S. PATENT DOCUMENTS

| | | | |
|---|---|---|---|
| 4,609,105 | 9/1986 | Manes et al. | 360/133 X |
| 4,677,516 | 6/1987 | Iizuka et al. | 360/133 |
| 4,739,434 | 4/1988 | Iizuka et al. | 360/133 |
| 4,899,244 | 2/1990 | Morse | 360/133 |
| 4,979,065 | 12/1990 | Ikebe et al. | 360/133 |

FOREIGN PATENT DOCUMENTS 59-227076  12/1984  Japan .................................. 360/133

*Primary Examiner*—John H. Wolff
*Attorney, Agent, or Firm*—Oblon, Spivak, McClelland, Maier & Neustadt

[57] ABSTRACT

A disk cartridge comprises a casing formed by combining upper and lower half casings so as to rotatably receive therein a disk-like magnetic medium with a center hub which is connectable to a magnetic recording/reproducing device and a hub-position determining annular rib formed at the central portion of the inner surface of the upper half casing so as to define a rotating region for the hub, wherein the hub-position determining annular rib is discontinuous.

6 Claims, 7 Drawing Sheets

DISK CARTRIDGE HAVING DISCONTINUOUS HUB-POSITION DETERMINING RIB

BACKGROUND OF THE INVENTION

1. Field of the Invention

The present invention relates to a disk cartridge in which a disk-like magnetic medium is held in a casing which is formed by combining upper and lower half casings.

2. Discussion of Background

Floppy disks have widely been used as exchangeable information storage media which can be fitted to or removed from a magnetic recording/reproducing device for storage or transportation in the same manner as magnetic tape cassettes and disk packs. However, so-called 8-inch or 5-inch floppy disks, which have been generally used, have disadvantages that the mechanical strength of the casing is poor and dust easily enters into the inside of the casing.

In 3.5-inch floppy disks, the above-mentioned disadvantages are eliminated by the measures that a casing formed by combining upper and lower half casings made of a resinous material is used, a shutter is provided at the magnetic head insertion window formed in either or both half casings, and a hub formed in a magnetic disk is opposed to a magnetic disk driving window, the magnetic disk being held in the casing in a rotatable manner.

FIG. 8 is a diagram of a conventional disk cartridge mounted on a magnetic recording/reproducing device, the diagram corresponding to a cross-sectional view taken along a line A—A in FIG. 6. In FIG. 8, a reference numeral 10 designates a disk cartridge of a hard casing which is formed by combining upper and lower half casings 12, 14, in which a magnetic disk (not shown) attached with a hub at its central portion is rotatably received, and a numeral 16 designates a driving shaft of the magnetic recording/reproducing device, which extends into the central opening of the hub to be connected with it. A reference numeral 18 designates a position-determining annular rib which defines a rotating region for the hub, the annular rib being formed at the central portion of the inner surface of the upper half casing 12 as a base plate, and a numeral 20 designates a magnetic disk driving window formed at the central portion of the lower half casing 14 as a base plate.

The detail of the construction of each of the inner surface of the upper and lower half casings 12, 14 will be described with reference to FIGS. 6 and 7. As is clear from FIG. 6, the position-determining annular rib 18 is in a continuous circle form, and the annular rib 18 is adapted to bear the end of the driving shaft 16 at its center of the region surrounded by the continuous circular rib 18. Outside the annular rib 18, arched walls 22, 24 are concentrically arranged and a circle formed by the both arched walls faces the magnetic disk and the hub, and forms a rotating region for them. A magnetic head insertion window 26 opens at the rotating region of the magnetic disk. A plurality of rod-like hubs 28 project vertically from the inner surface of the upper half casing 12 at a position corresponding to a lifter.

As is clear from FIG. 7, the shape of the magnetic disk driving window 20 is circular, and the inner diameter of the window is slightly larger than the outer diameter of the annular rib 18 and formed in a concentric manner. At a radially outer portion of the magnetic tape driving window 20, arched walls 30, 32 which oppose the arched walls 22, 24 of the upper half casing 12 project. A magnetic head insertion window 34 is formed in the lower half casing at the rotating region of the magnetic disk. A plurality of ribs 36 are also formed on the inner surface of the lower half casing so as to be used for fixing the lifter.

In use of the conventional disk cartridge 10, when the cartridge 10 is mounted on a magnetic recording/reproducing device, the top of the driving shaft 16 comes in contact with the central portion of the inner surface of the upper half casing 12 so as to push it up, whereby the upper half casing 12 is deformed by an upwardly projecting force by the driving shaft 16. The deformation rather takes place at a portion outside the annular rib 18 for determining the position of the hub. It is because the annular rib 18 continuously surrounds that area having its center to which the end portion of the driving shaft 16 contacts, and the central area of the upper half casing is hardly deformed because of its having a large rigidity. Accordingly, the deformation mostly occurs at the outer circumferential portion of the upper half casing 12, this causing deformation in the lower half casing 14 by the influence of the deformation in the upper half casing 12. Since the lower half casing 14 has reference holes 38, 40 at its outer circumferential portion of the base plate which are used for determining the position of the disk cartridge 10 to the magnetic recording/reproducing device. Therefore, the deformation of the lower half casing 14 can not determine the correct position and prohibits normal recording/reproducing operations.

SUMMARY OF THE INVENTION

It is an object of the present invention to provide a disk cartridge which assures correct position-determination when the disk cartridge is mounted on a magnetic recording/reproducing device, and allows normal recording and reproducing operations by improving a hub-position determining annular rib projecting from the central portion of the upper half casing.

The foregoing and other objects of the present invention have been attained by providing a disk cartridge which comprises a casing formed by combining upper and lower half casings so as to rotatably receive therein a disk-like magnetic medium with a center hub which is connectable to a magnetic recording/reproducing device and a hub-position determining annular rib formed at the central portion of the inner surface of the upper half casing so as to define a rotating region for the hub, wherein said hub-position determining annular rib is discontinuous.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
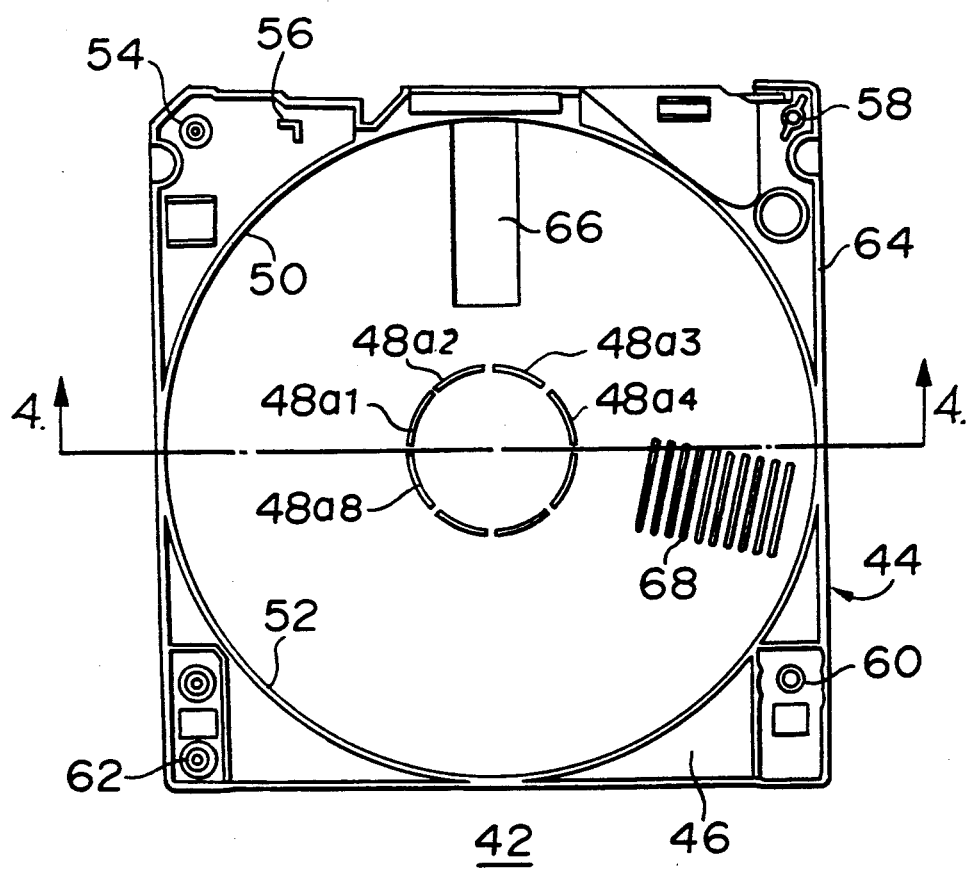
FIG. 1 is a plan view showing the inner surface of the upper half casing of an embodiment of the magnetic disk cartridge of the present invention.

Referring to the drawings, wherein the same reference numerals designate the same or corresponding parts throughout the several views, and more particularly to FIG. 1 thereof, there is shown a plan view showing the inner surface of the upper half casing of an embodiment of the magnetic disk cartridge according to the present invention. In FIG. 1, a reference numeral 42 designates an upper half casing, and a numeral 44 designates a square-shaped base plate of the upper half casing. On the inner surface 46 of the base plate 44, there are formed a position determining annular rib 48 at the central portion thereof to define a rotating region for the hub of a magnetic disk, two arched walls 50, 52 formed at the outside of the annular rib 48 in a concentric manner to thereby define a rotating region for the magnetic disk and connecting ribs 54, 56, 58, 60, 62 formed at the peripheral area of the base plate 44 and near the four corners. These rib 48, arched walls 50, 52 and the connecting ribs project in the vertical direction from the inner surface 46 of the base plate 44. Further, an outer circumferential wall 64 is formed in a continuous form at the four sides of the base plate so as to project in the vertical direction. The hub-position determining annular rib 48 is discontinuous, i.e. a plurality of, specifically, 8 arched ribs 48a1, 48a2, 48a3, 48a4 . . . 48a8 having the same length are arranged in a circular form with the same intervals. A magnetic head insertion window 66 having a rectangular shape is formed in the rotating region of the magnetic disk and a plurality of rod-like ribs 68 are formed projectingly at a position corresponding to a lifter.

Figure 2:
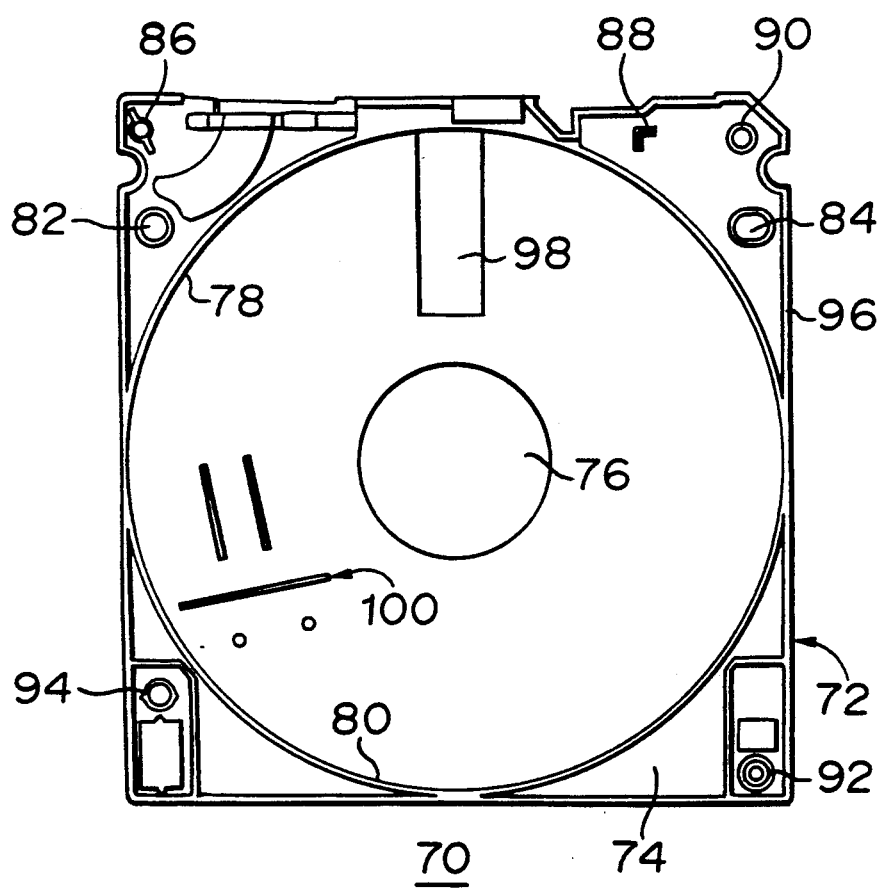
FIG. 2 is a plan view showing the inner surface of the lower half casing to be combined with the upper half casing as shown in FIG. 1.

FIG. 2 is a plan view showing the inner surface of the lower half casing to be coupled with the upper half casing, wherein a reference numeral 70 designates a lower half casing and a numeral 72 designates a square base plate constituting the lower half casing. The lower half casing 70 is the substantially same as the conventional lower half casing 14. Namely, a magnetic disk driving window 76 is formed at the central portion of the inner surface 74 of the base plate 72. Arched walls 78, 80 are formed at an outer portion of the magnetic disk driving window 76 so as to define a rotating region for the magnetic disk. Reference holes 82, 84 are formed at two corner portions at the outside of the arched walls 78, 80 whereby the disk cartridge can be correctly positioned in the magnetic recording/reproducing device. Connecting ribs 86, 88, 90, 92, 94 are formed at or near the four corner portions. An outer circumferential wall 96 is formed to surround the four sides so as to project from the inner surface 74. A magnetic head insertion window 98 is formed in the rotating region of the magnetic disk, and connecting ribs 100 for receiving lifters are formed so as to project from the inner surface 74 of the base plate 72.

Figure 3:
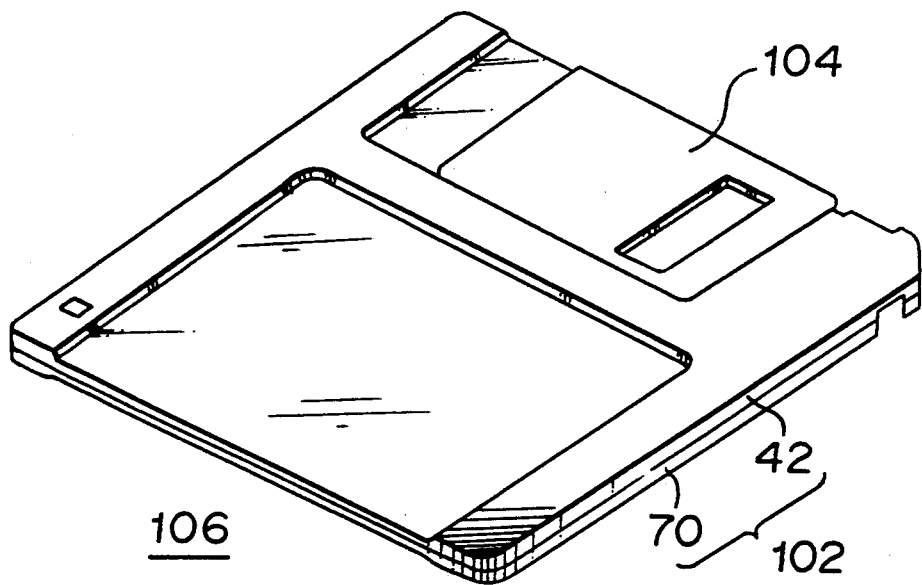
FIG. 3 is a perspective view of the disk cartridge as shown in FIG. 1.

The magnetic disk cartridge with the upper and lower half casings 42, 70 is assembled as follows. Lifters and lining members are attached to predetermined positions in the rotating region for the magnetic disk. A magnetic disk having a hub firmly attached to its central portion is put in the combined upper and lower half casings 42, 70 in a rotatable manner, and the connecting ribs formed in the upper and lower half casings in corresponding relations (e.f., 54, 90) are all fastened. Then, shutters 104 are mounted on predetermined positions of the casing 102 as shown in FIG. 3 to close the magnetic head insertion windows 66, 98. Thus, the magnetic disk cartridge 106 is completed. The hub of the magnetic disk faces the magnetic disk driving window 76 of the lower half casing 70.

Figure 4:
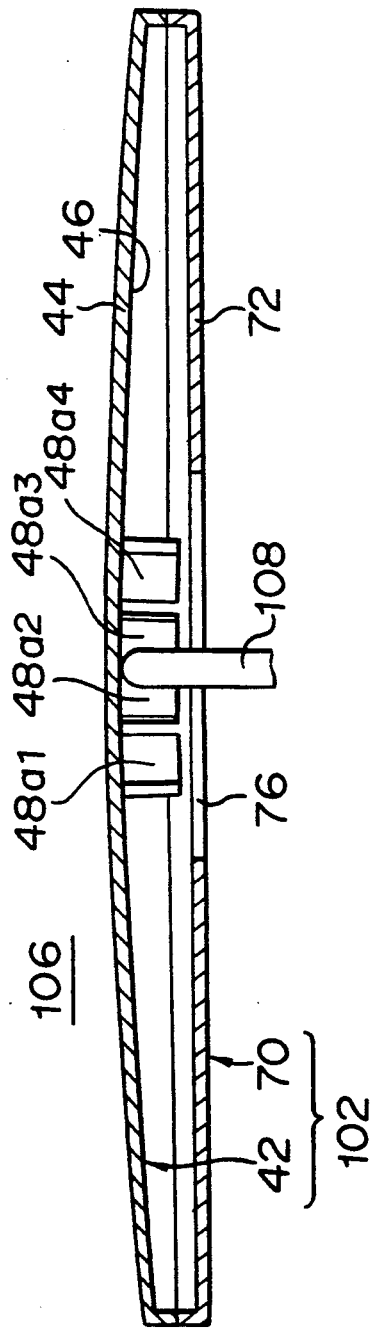
FIG. 4 is a longitudinal cross-sectional view, which is taken along a line B—B in FIG. 1, of the disk cartridge as in FIG. 1 in a case that it is mounted on a magnetic recording/reproducing device.
Figure 8:
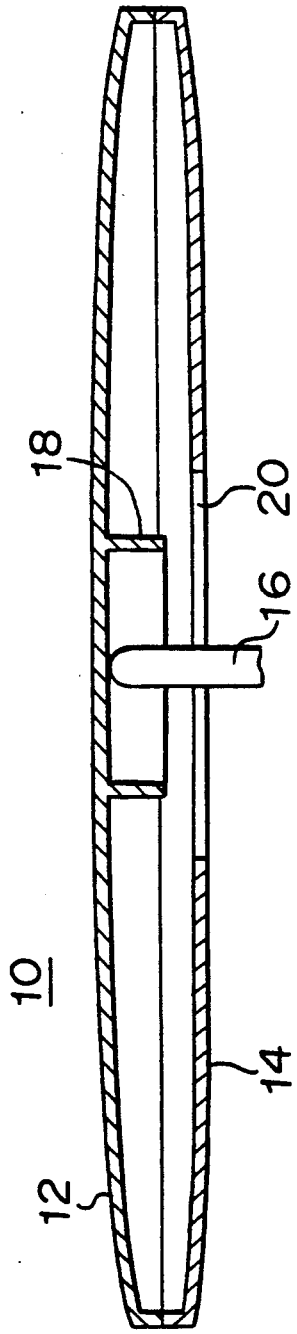
FIG. 8 is a longitudinal cross-sectional view, which is taken along a line A—A in FIG. 6, of the disk cartridge as in FIG. 6 in a case that it is mounted on a magnetic recording/reproducing device.

FIG. 4 is a diagram showing a state that the disk cartridge as shown in FIGS. 1 through 3 is mounted on a magnetic recording/reproducing device, the diagram being a longitudinal cross-sectional view taken along a line B—B in FIG. 1. In FIG. 4, a reference numeral 108 designates a driving shaft extending from the driving section of the magnetic recording/reproducing device. The driving shaft 108 is connectable to a hub (not shown) formed at the central portion of a magnetic disk by inserting it into a central opening formed in the hub, and the top end of the driving shaft 108 is brought into contact with the center of the inner surface of the base plate constituting the upper half casing 42. A pushing force directing upwardly of the driving shaft 108 causes deformation in the base plate 44 of the upper half casing 42. The deformation takes place even at the central portion of the base plate 44. It is because the hub-position determining annular rib 48 surrounding the contacting portion of the driving shaft 108 is discontinuous wherein discontinuous portions (non-existing portions) are uniformly distributed between each adjacent arched ribs 48a. Accordingly, the base plate 44 is deformable and the rigidity of the base plate at the central portion is small, whereby the base plate is easily deformed in various directions. Therefore, a substantially uniform deformation is obtainable on the entire area of the base plate 44 for the upper half casing 42 and it is little possibility of the deformation of the base plate near its outer circumferential portion, which eliminates adverse influence to the lower half casing 70, and therefore, the deformation of the base plate 72 for the lower half casing 70 does not occur. Accordingly, the positional relation between the reference holes 82, 84 which are essential to the position-determination of the disk cartridge 106 is correctly maintained, so that the disk cartridge can be correctly positioned in the magnetic recording/reproducing device.

Figure 5:
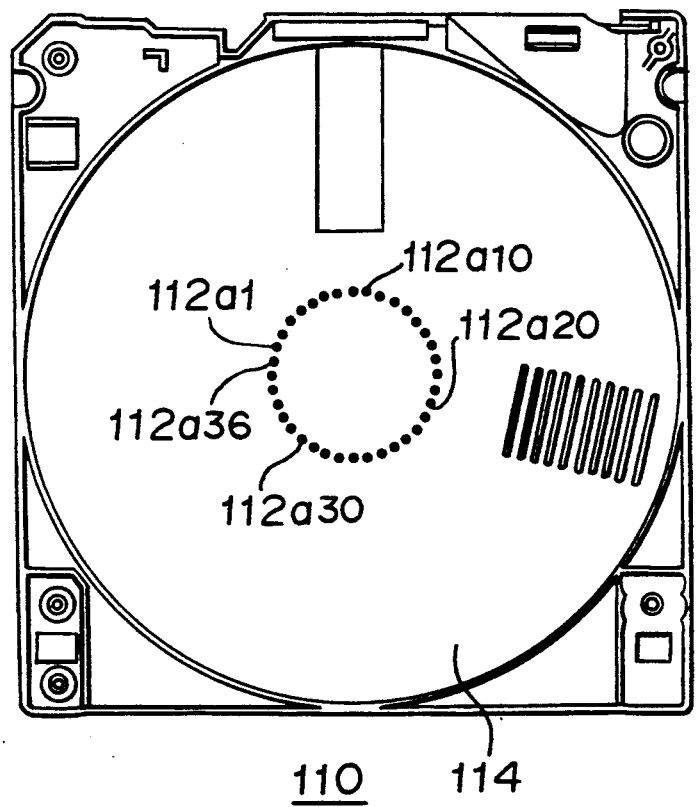
FIG. 5 is a plan view showing the inner surface of the upper half casing of another embodiment of the disk cartridge according to the present invention.
Figure 6:
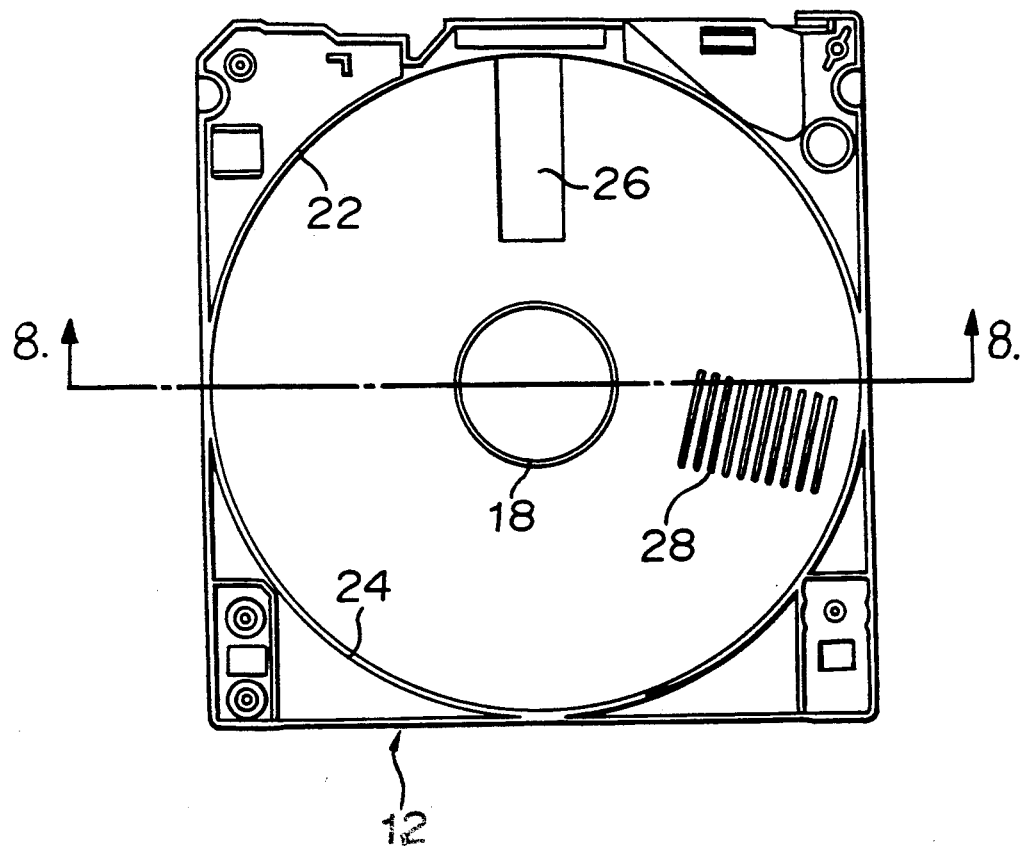
FIG. 6 is a plan view of the inner surface of the upper half casing of a conventional magnetic disk cartridge.
Figure 7:
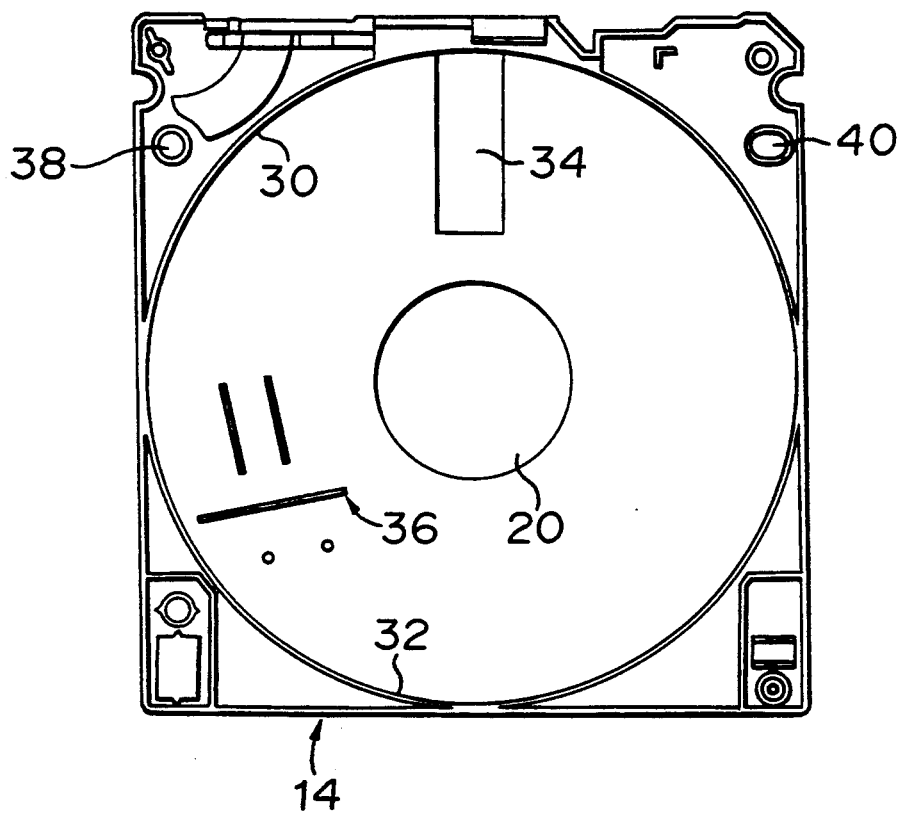
FIG. 7 is a plan view showing the inner surface of the lower half casing to be coupled with the upper half casing as in FIG. 6.

FIG. 5 is a plan view showing the inner surface of the upper half casing of another embodiment of the magnetic disk cartridge according to the present invention. The construction of the upper half casing is the substantially same as that of the before-mentioned embodiment except that the structure of position determining annular rib 112 for defining the rotating region for the hub is different. Namely, a plurality of bosses are used instead of the arched rib portions as in FIG. 1. In this specified embodiment, for instance, 36 bosses 112a1 ... 112a36 are arranged in a circular form with constant intervals between adjacent bosses on the inner surface of the upper half casing 110.

In the embodiment as shown in FIG. 5, when the disk cartridge is put on the magnetic recording/reproducing device, the base plate 114 of the upper half casing 110 is pushed upwardly to thereby cause deformation. Such deformation is apt to occur at the central portion of the base plate 114 as well. However, there are a large number of bosses 112a in a circular form wherein spaces between the bosses are distributed uniformly. Accordingly, the rigidity of the base plate 114 at or near the central portion is further small. Accordingly, when the base plate 114 is bent at the portion having a small rigidity, it is easily deformed in various directions. Then, a uniform deformation is obtainable over the entire portion of the base plate 114, whereby the deformation of the upper half casing does not substantially influence on the lower half casing, and the disk cartridge can be correctly positioned in the magnetic recording/reproducing device.

The hub-position determining annular rib according to the present invention may be in combination of an arched rib (ribs) and a boss (bosses).

Thus, in accordance with the present invention wherein the hub-position determining annular rib formed at the central portion of the upper half casing is discontinuous, the central portion is apt to deform and deformed portions are dispersed in the entirety of the upper half casing. Accordingly, the deformation of the upper half casing does not adversely influence on the lower half casing and the disk cartridge can be correctly positioned in a magnetic recording/reproducing device to thereby obtain normal recording or reproducing.

In the hub-position determining annular rib formed with a plurality of arched ribs or a plurality of bosses, the space between adjacent ribs or bosses, the position and the number of the adjacent ribs or bosses can be optimally selected in consideration of the rigidity of the upper half casing at or near its central portion, i.e. a degree of deformation or the direction of the deformation of the upper half casing.

Obviously, numerous modifications and variations of the present invention are possible in light of the above teachings. It is therefore to be understood that within the scope of the appended claims, the invention may be practiced otherwise than as specifically described herein.

What is claimed is:

1. A disk cartridge for rotatably receiving a disk-like magnetic medium mounted on a center hub, said disk cartridge comprising:
   an upper half casing and a lower half casing;
   a hub-position determining annular rib formed at a central portion on an inner surface of said upper half casing and projecting outwardly from said inner surface so as to define a center hub rotating region;
   wherein said hub-position determining annular rib is discontinuous.

2. The disk cartridge according to claim 1, wherein said rotating region has a center point, and wherein said hub-position determining annular rib comprises a plurality of arched ribs, each arched rib having a center of curvature located at the center point of said rotating region.

3. The disk cartridge according to claim 2, wherein said arched ribs are positioned end to end and spaced at equal intervals from one another.

4. The disk cartridge according to claim 1, wherein said rotating region has a center point, and wherein said hub-position determining annular rib comprises a plurality of bosses arranged equidistant from said center point.

5. The disk cartridge according to claim 4, wherein said bosses are equally spaced from one another.

6. The disk cartridge according to claim 1, wherein said hub-position determining annular rib has an outer diameter, and wherein said lower half casing has a circular disk driving window formed therein, said disk driving window having a diameter slightly larger than said outer diameter of said hub-position determining annular rib.

* * * * *